United States Patent [19]
Norkaitis

[11] 3,769,576
[45] Oct. 30, 1973

[54] APPARATUS INCLUDING AN OSCILLATOR FOR DETECTING SHORT CIRCUITS IN ELECTRICAL COMPONENTS

[76] Inventor: Anthony B. Norkaitis, 906 Liden Ct., Western Springs, Ill.

[22] Filed: June 2, 1972

[21] Appl. No.: 259,268

[52] U.S. Cl. .............................. 324/51, 324/62 R
[51] Int. Cl. ........................................... G01r 31/02
[58] Field of Search .................. 324/51, 62, 52, 30

[56] References Cited
UNITED STATES PATENTS
3,163,817  12/1964  Simpson .............................. 324/52
3,284,707  11/1966  Clinton .............................. 324/51 X
3,529,237  9/1970  Kilchhofer .......................... 324/51

FOREIGN PATENTS OR APPLICATIONS
1,072,822  6/1967  Great Britain ...................... 324/51

OTHER PUBLICATIONS
Tyler, Tommy N., Continuity Tester Finds Low-Resistance Circuits Radio-Electronics, V. 37, No. 4, April 1966, pp. 82, 83

Primary Examiner—Gerard R. Strecker
Attorney—James T. Fitzgibbon

[57] ABSTRACT

An apparatus for testing short circuit in electrical components such as motor or generator stators having plural windings with extremely low direct current resistance but measurable high frequency alternating current impedance. Preferably, the invention is embodied in a tester unit which includes leads for attachment to individual current windings forming a part of the article to be tested, and a transistor oscillator operated by a battery and having a display device such as a milliammeter in the output circuit in series with a diode or the like. A feedback circuit parallel with the milliammeter and the exterior load includes a center tapped inductor and a variable resistor in series with each other and controlling base current.

The method includes operating the oscillator so as to produce a pulsating DC current in the output circuit, and successively connecting the exterior leads to each individual winding in the stator to be tested, and comparing the impedance readings of the windings with each other after calibrating the meter by adjusting the variable resistor to provide maximum current in the external circuit.

7 Claims, 3 Drawing Figures

PATENTED OCT 30 1973 3,769,576
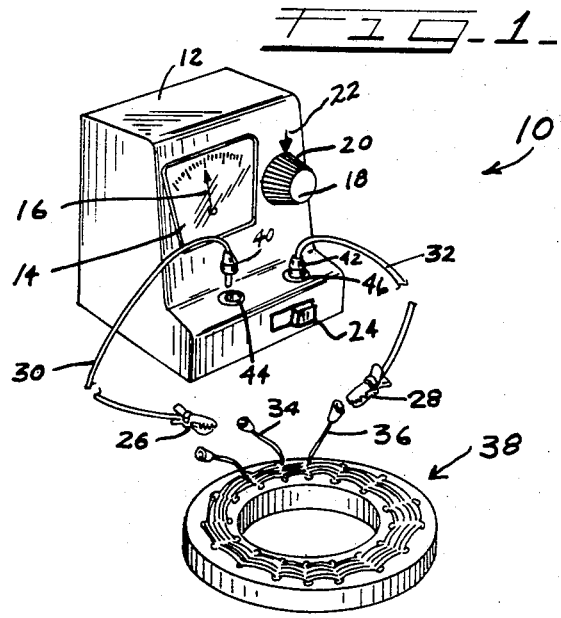
Fig-1-
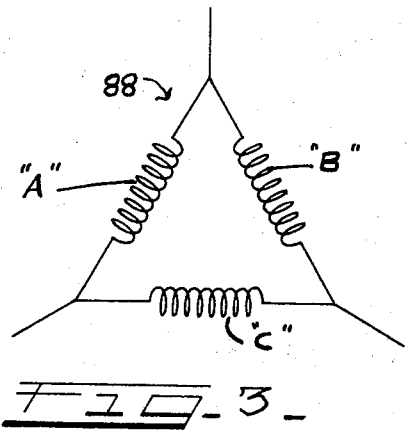
Fig-3-
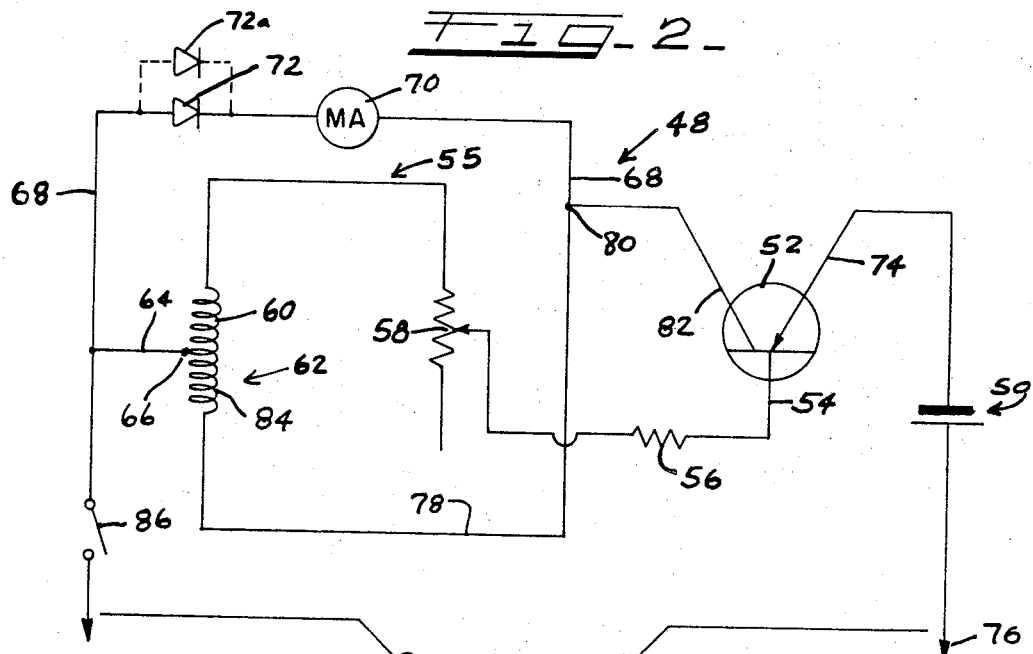
Fig-2-
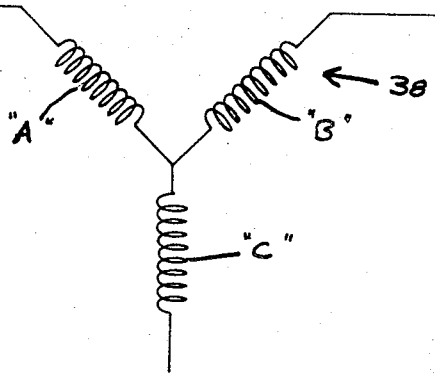

APPARATUS INCLUDING AN OSCILLATOR FOR DETECTING SHORT CIRCUITS IN ELECTRICAL COMPONENTS

BACKGROUND OF THE INVENTION

The present invention relates to an electrical testing apparatus, and more particularly, to an apparatus for testing for short circuits in electrical components such as motor or generator stators having windings characterized by extremely low direct current (DC) resistance.

In a preferred form, the invention is embodied in a battery operated portable tester which includes means for connection across the windings of automotive alternator stators or other components, and includes a battery operated variable frequency oscillator for producing a pulsating DC signal, means for establishing a predetermined current flow in the external circuit, and means for display of this value. Accordingly, when an external connection is made to a first winding, the impedance thereof may be noted and compared with that of any other winding.

The invention also provides a simplified method of testing for other short circuits or open circuits in an electrical component, such as an alternator stator, by providing a pulsating current source and a measuring instrument for comparison of the impedances of plural windings to determine whether, in the case of a satisfactory stator, all windings pass the same current or whether, in the case of a defective component, one or more windings passes less than its intended current.

Within about the last ten years, the alternating current (AC) generator, commonly referred to in the trade, and sometimes referred to herein, as an alternator, has replaced the direct current generator previously used in virtually all automotive applications. According to current practice, most alternators contain an exterior, generally annular stator, which contains three current windings arranged in the Y-form or the delta form, and each alternator includes diodes and capacitors for creating a relatively ripple-free DC voltage from the alternator, which is driven at speeds varying between a few hundred to five or six thousand or more revolutions per minute.

While alternators are generally more trouble-free and reliable in use than the direct current generators they have now almost completely replaced, a certain number of alternators fail in use, either from random causes or from physical damage. Because failure may occur within the diode or rectification portion of the alternator, or within the stator, or within the rotor or armature, or elsewhere, it is preferred to isolate the trouble before attempting repair or replacement. However, inasmuch as rebuilt alternator units as a whole are not unduly expensive, it is not an uncommon practice to replace the entire unit without determining the exact nature of the difficulty. This undesirable situation has been caused in large part by the fact that no economical testing equipment, particularly readily portable equipment, has been available for this purpose. Accordingly, analysis of alternator electrical problems on the site has been difficult or impossible. In fact, in some repair and rebuilding operations, including operations wherein stators are rewound, it has actually been common to rewind stators which actually did not need replacement.

Referring now in particular to prior art apparatus for determining the presence of short circuits in alternator stators or like components, it has been known to use DC ohmmeters for this purpose. However, since the stator of a typical alternator comprises a number of turns of relatively large size copper wire, its DC resistance is extremely low, often ranging between 0.5 ohms and 0.001 ohms. Therefore, unless an extremely sensitive and prohibitively expensive instrument is utilized, there is no discernible resistance difference between a short circuited winding and an ordinary winding, for the reason that copper wire has very little DC resistance in any length commonly selected for this purpose.

A second method which has been used to test for short circuiting in alternator stators or the like uses a series of transformers and a three phase input arrangement, whereby a series of meter readings are taken for comparison purposes to determine the impedance in each of the winding under an applied AC signal. In addition to being cumbersome, expensive, and lacking in portability, arrangements of this type are ordinarily limited to 60 cycles or other relatively low frequency line current; the typical automotive alternator operates most of the time on a much higher frequency than this.

A third commonly used arrangement, but one which has also not been particularly successful, is one which embodies a so-called "growler" coil which is moved about the inner periphery of the stator after armature removal. Theoretically, a short circuit in one of the windings will induce a characteristic magnetic field in a portion of the core near the short, thereby attracting a spring-loaded metal reed which will then oscillate to indicate the presence and approximate location of such short. However, alternator stators are often not characterized by significant amounts of iron in the core, and this method has therefore not proven to be satisfactory from a practical standpoint. Moreover, units of this type are not ordinarily portable and are therefore of limited use where they are most needed.

In view of these and other shortcomings of the prior art, therefore, it is an object of the present invention to provide an improved electrical tester.

Another object is to provide a battery powered, readily portable tester for alternator stators.

A still further object is to provide an electrical tester adapted for use in detecting the presence of short circuits in electrical components characterized by minimal direct current resistance but having sufficient inductance to be characterized by measurable impedance, especially at a frequency of several hundred cycles per second (Hertz) or more.

Another object is to provide a simplified electrical tester which includes a variable frequency oscillator adapted to provide a pulsating direct current signal, means in the apparatus for connection to an external circuit having significant impedance, and means for measuring and displaying the current flowing through the external circuit.

Another object is to provide a tester of small size and light weight, which may be powered by a battery, and which does not consume current except when actually connected to an external load for testing purposes.

A still further object is to provide a tester unit having a battery powered oscillator for producing a pulsating DC signal, means for varying the output frequency of the oscillator, means for measuring the current in an external circuit, and means for measuring and displaying the current flowing in the circuit, whereby comparison may be made between consecutive tests or readings to establish whether a succession of tested articles has substantially the same or measurably different impedances.

Still another object is to provide a method for testing low resistance, moderate impedance circuits which includes generating within a tester unit a pulsating direct current having a predetermined frequency lying within relatively wide limits, adjusting the frequency within these limits until maximum current flow occurs in the external circuit, connecting the tester unit in which such pulsating current is generated to an external circuit, and measuring the current flowing in the external circuit a plurality of times for comparison purposes, whereby short circuit and long circuit windings may be readily identified.

Another object is to provide a test apparatus which includes first and second terminals for connection to opposite ends of an external circuit, an energy source in the internal circuit, means in said internal circuit for creating a pulsating direct current signal, means for controlling frequency of said pulsations, and means for measuring current flow in the circuit when the terminals are connected to the external circuit, whereby the impedance of the external circuit under test conditions may be measured for comparison purposes.

The foregoing and other objects and advantages of the invention, including inherent objects and advantages are achieved in practice by providing a tester having a source of pulsating direct current, means for adjusting the frequency of the pulsations, current measuring means in the circuit, and means for connecting the ends of the circuit to the ends of an external load having measurable impedance and extremely small direct current resistance, whereby current flow differences between windings containing short circuits and windings free from short circuits may be readily determined.

The foregoing and other objects and advantages are also carried out by providing a variable frequency oscillator, a battery for operation thereof, a current meter in series with the output of the oscillator, and means for completing the oscillator circuit by attachment of the terminal ends thereof to an exterior load having substantial impedance in relation to its direct current resistance. The manner in which the foregoing and other objects and advantages are carried into practice will become more apparent when reference is made to the accompanying detailed description of the preferred embodiments of the invention set forth by way of example, to the appended claims, and to the accompanying drawings wherein like reference numerals indicate corresponding parts throughout.

DESCRIPTION OF THE DRAWINGS

FIG. 1 is a perspective view of a portable, battery powered test instrument embodying the invention, and showing a pair of leads attached to the instrument and having the ends thereof adapted to be connected across an external load shown as an electrical stator;

FIG. 2 is a schematic view of one form of circuit which can be used to carry the present invention into practice, and showing one form of external load which may be tested by the instrument of the invention; and FIG. 3 is a schematic form of an alternate form of load which may be readily tested using the instrument of the invention.

DESCRIPTION OF THE PREFERRED EMBODIMENTS OF THE INVENTION

Although it will be understood that the principles of the present invention may be embodied in various forms, a detailed description thereof will be made in respect to an instrument embodying the invention and including a battery as an energy source, a milliammeter for display of current readings, an external frequency adjustment, and a pair of external leads for connection to the load whose impedance is to be measured.

Referring now particularly to FIG. 1, the testing instrument of the invention is generally designated 10 and the instrument 10 includes a housing 12 havin— a calibrated dial 14 on the face thereof, with the dial 14 further including a needle 16 or other indicator forming a part thereof. A control knob 18 is arranged so that any point on the periphery 20 thereof may be placed opposite a fixed indicator 22 when switch 24 is turned to the on position and when connection is made between the ends 26, 28 respectively of a pair of exterior leads 30, 32 and the end portions 34, 36 of an exterior electrical load generally indicated at 38. In the preferred form, the inner ends 40, 42 of the leads 30, 32 are in the form of plugs adapted to be received in jacks or sockets 44, 46, on the body 12 of the instrument 10.

Referring now to FIG. 2, there is shown a schematic diagram of a preferred form of circuit generally designated 48 and which comprises the power supply and oscillator contained within the instrument housing 12. As shown in FIG. 2, the circuit 48 comprises a number of principal components, including means in the form of a one cell battery 50 for supplying energy to a transistor 52 having the base lead 54 thereof connected to a feedback circuit generally designated 55 and which includes a fixed resistor 56, a variable resistor or potentiometer 58, and an inductance in the form of a coil 62 which is center tapped at 66 and thus divided into first and second windings 60, 84. A line 64 also extends between the center tap 66 on the inductor 62 and the output line 68.

As shown, means in the form of a milliammeter 70 are provided in the output line 68 for measuring and displaying a reading indicative of the average current flowing in the line 68. The output line 68 also includes one or more diodes 72; if more than one diode is used, the additional diode 72a, which is shown to be connected by phantom lines, is placed in the line 68 parallel to the first diode 72. The emitter lead 74 of the transistor 52 is connected to one terminal of the battery 50, with the other terminal thereof terminating in a connector 76 for attachment to the external load generally designated 38.

In the preferred arrangement, the feedback circuit 55 also includes a line 78 extending between a point 80 in the output line 68 and the end terminal of the winding 84 forming a part of the coil 62. The point 80 in the line 68 lies between the connector lead 82 and the meter 70. Thus, the signal from the collector lead 82 may be fed to the base 54 through both windings 60, 84 of the inductor 62 in the line 78, and may also be fed back through a part of the feedback circuit 55 through the line 64 and the coil winding 60. Switch 86 in the output line 68 permits the external load 38 to be energized or de-energized as desired, with the oscillator circuit 48 drawing no current when the switch 86 is open.

With the foregoing arrangement, assuming that suitable connections are made so that current may flow in the external circuit, such as through the inductive load 38, an oscillating or pulsating DC current will occur in the output line 68 by reason of the controlled or tuned feedback between the collector and the base of the transistor 52. Since only one transistor is provided, and since the diode 72 or diodes 72, 72a are placed in the output line 68, current flows occurs in only one direction in the line 68 and thus a pulsating direct current will occur in the external load as opposed to a true alternating current. The effective resistance of the potentiometer 58 may be varied, as by manipulating the knob 18, thereby changing the frequency at which the circuit 48 will oscillate, and the amount of current flowing in the circuit. The preferred frequencies or frequency ranges, and current consumption depend primarily on the characteristics of the load or external circuit, as will be referred to elsewhere herein.

Referring now to the use of the instrument, it will be assumed that the switch 86 is closed and that the load 38 is connected, the circuit 48 will begin to oscillate with a characteristic frequency, and milliammeter 70 will indicate the current flowing in the external circuit. Since the impedance of the load 38 varies with the frequency of the oscillator because of the inductive nature of the load 38, a center scale, steady-state reading of the meter 14 may be achieved at a selected setting of the knob 18 which controls the resistance of the potentiometer or variable resistor 58.

Whereas the resistance of the potentiometer 58 will produce different characteristic current flow, depending on the external load, in carrying out the preferred method, it is desired first to connect the external load, and then to adjust the potentiometer 58 until approximately a center scale reading is obtained, thus permitting higher and lower readings to be observed. In practice, the meter is quite stable and this adjustment takes only a matter of a few seconds. For purposes of the foregoing discussion, it has also been assumed that the terminals, such as the alligator clips 26, 28, were connected to any two of the ends 34, 36 of the load 38, placing coils identified in FIG. 2 as coils "A" and "B" in series with each other in external circuit 48.

Assuming further that the meter 14 will read one milliampere at full scale, and that the needle is adjusted to a 0.5 milliamp reading by manipulation of the dial 18, this reading is noted. Since inductors "A," "B" and "C," which are actually the stator windings in the preferred use of the invention, are designed to have equal impedance, the same reading should appear on the dial 14, regardless of which pair of inductances, "A-B," "A-C" or "B-C" are in the external load. Therefore, after the reading indicative of current flow in winding "A-B" is taken, the clips 26, 28 are then manipulated so as to place inductors "A" and "C" in the external circuit and the reading is noted. Similarly, the clips 26, 28 are again manipulated to place windings "B" and "C" in series, and the last reading is taken.

If all readings are the same, the stator is free from short circuits, whereas if one or more of the windings are short-circuited, the fact will immediately become apparent, since the needle will indicate a higher current flow in such winding by reason of decreased impedance.

As pointed out above, using a milliammeter of only moderate sensitivity, a clearly noticeable difference in current will be readily apparent ordinarily, a difference in current magnitude of 10 percent to 30 percent is encountered, thereby clearly and unambiguously indicating the presence and the identification of the short circuited windings. Clearly, if there is actually a discontinuity in the windings, no detectable current will flow, and this condition can also be detected.

Referring now to FIG. 3, another arrangement of winding connections is shown, and is generally designated 88. This form of connection between windings is sometimes used in alternator or generator stators and other electrical equipment, such form being referred to as a "delta" connection. As shown, the delta arrangement 88 also includes three windings "A," "B" and "C" which are the same as their counterparts shown in the "Y" form as comprising the external load 38 in FIG. 2. When using the apparatus 10 of the invention to test windings arranged in the delta form, the clips 26, 28 are manipulated in the same way as described in connection with the winding shown in Example 2, and accordingly, the apparatus and method of the invention are able to be used equally well with either the Y or delta winding arrangement.

Referring now generally to the electrical circuit 48, since the most basic requirement thereof for use in the instrument 10 is that it oscillate at a frequency of from about 500 to 5,000 cycles, and preferably about 1,000 to 1,500 cycles per second, with an external load typically comprised of one or two windings of an anternator stator, the values used in the various circuit components are not particularly critical.

However, assuming that such external load would have from about 5 to 8 ohm impedance at the frequencies in question, although having only 0.5 to 0.001 ohms DC resistance, an operative circuit 48 may be constructed using a 1.5 volt battery 50, and using a PNP type 3N1C transistor or a Motorola HEP 230 transistor as the transistor 52 of FIG. 2. The resistor 56 is preferably 100 ohms, with potentiometer 58 having a maximum resistance of 1,000 ohms. The winding 60 of the coil 62 may be an 8 ohm winding from the output transformer used with a radio or television speaker, such units normally having a 6.3 volt output when used with a speaker in a manner well known to those skilled in the art. The inductor 84 may, by way of example, comprise 17 to 25 turns of a number 21 wire.

The milliammeter is a conventional type, and the diodes 72, 72a may be germanium or silicon diodes of a 50 PIV rating. As pointed out, the meter 70 preferably has a full scale reading of one milliamp or slightly more. The components just described may be varied somewhat, with the preferred components yielding an oscillator having sufficient voltage and current to provide just more than a full scale reading on the instrument 70.

Otherwise described, the winding 60 may be a winding from a 300 milliamp, 6.3 volt filament transformer, and the resistor 58 may be adjustable between 0 and 500 ohms. The foregoing values are set forth merely by way of example, it being assumed that the performance characteristics referred to herein may easily be obtained by one skilled in the art, using the values set forth above or any other values of one or more of the components adapted to bring about the results referred to herein.

In summary, it will be appreciated that the invention provides a simple tester unit which may be easily used without the exercise of great skill, and which, while highly reliable and easily portable, performs as well or better than expensive and complex prior art devices intended for the same general purpose.

It will thus be seen that the present invention provides a novel test instrument and method having numerous advantages and characteristics, including those referred to herein and others which are inherent in the invention. A preferred embodiment having been described by way of example, it is anticipated that various modifications and changes thereof may be made without departing from the spirit of the invention or the scope of the appended claims.

I claim:

1. An apparatus for testing for short circuits in an external circuit comprising plural electrical windings having relatively great impedance in relation to the direct current resistance thereof, said apparatus comprising, in combination, an oscillator circuit and means for readily detachable connection of the terminals thereof to an external circuit which includes said inductive load, said oscillator circuit including means for supplying electrical energy in the 500 to 5,000 cycle per second range to said external circuit, an output circuit, and means for controlling the current flow in said output circuit, said output circuit including an ammeter for measuring the flow of current therein and at least one diode in series with said ammeter for insuring current flow in one direction through said ammeter, said output circuit control means including a current control device operatively controlled by a feedback circuit having parallel input portions and containing a variable resistance in series with said parallel portions, each of said parallel portions having an inductance therein, with one of said parallel portions being connected to said output circuit on one side of said means for controlling current flow direction and the other of said parallel portions being connected to said output circuit on the other side of said means for controlling current flow direction.

2. An apparatus as defined in claim 1 wherein said electrical energy supply and said internal circuit are disposed within a portable instrument, said instrument having a display means associated therewith for displaying a reading made by said ammeter.

3. An apparatus as defined in claim 1 in which said means for controlling current flow in said output circuit is in the form of a transistor.

4. An apparatus as defined in claim 1 in which two parallel connected diodes are in series with said ammeter.

5. An apparatus as defined in claim 1 in which the inductance in one of said parallel input portions of said feedback circuit comprises a first coil, and in which the inductance in the other of said parallel input portions of said feedback circuit comprises only a portion of said first coil, whereby said one feedback circuit has the same resistance but less inductance than said other circuit.

6. An apparatus as defined in claim 2, wherein said instrument includes calibration marks on said display means to facilitate retentive display of a previous reading to facilitate comparison of previous readings with later readings.

7. An apparatus as defined in claim 2 which includes switch means for rendering said internal circuit nonconductive when said instrument is attached to said external circuit but is not in use.

* * * * *